Jan. 14, 1958  J. F. HUFF  2,819,892
FRICTIONLESS PIVOT
Filed Oct. 25, 1954
Fig. 1
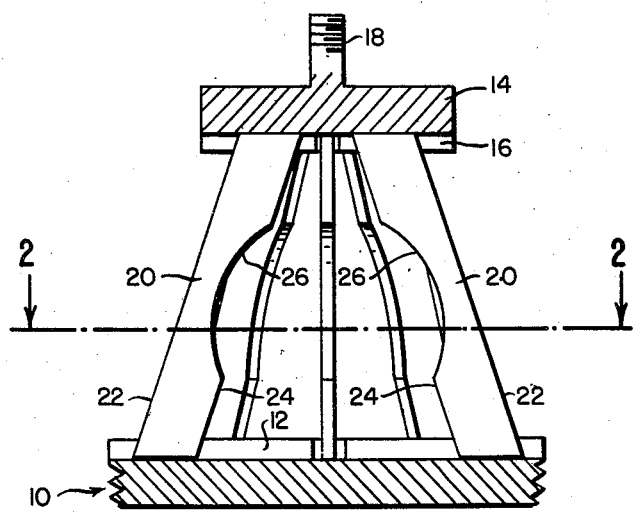
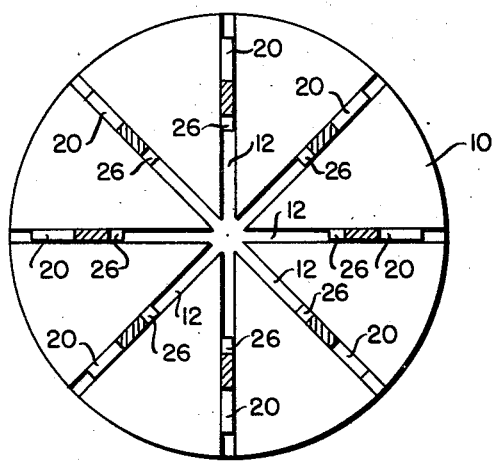
Fig. 2
INVENTOR.
JOSEPH F. HUFF
BY
ATTORNEYS

United States Patent Office 2,819,892
Patented Jan. 14, 1958

2,819,892

FRICTIONLESS PIVOT

Joseph F. Huff, Hyde Park, Mass., assignor, by mesne assignments, to American Radiator & Standard Sanitary Corporation, New York, N. Y., a corporation of Delaware Application October 25, 1954, Serial No. 464,472

4 Claims. (Cl. 267—1)

This invention relates to pivots, and more particularly to frictionless pivots having great lateral, compressional and tensional rigidity.

Manufacturers of meters have long sought a frictionless pivot capable of withstanding relatively great lateral, tensional, and compressional forces and which permits limited frictionless rotational displacement in response to a torque applied thereto, said displacement being either linear or non-linear with respect to the applied torque.

The primary object of this invention is to provide a frictionless pivot having the above-mentioned characteristics.

Another object of this invention is to provide a frictionless pivot of the above character capable of rotating at least 3 degrees without appreciable longitudinal movement, which is extremely inexpensive to manufacture and which has long-term stability.

To accomplish these and other objects, I provide as one important feature of this invention a plurality of leaf springs interconnecting a stationary member and a pivotally movable member, said springs lying in planes radiating from the axis of rotational displacement of the movable member.

Another feature of this invention is the frusto-conical orientation of the leaf springs interconnecting the fixed and movable plates.

Still another feature of this invention is the provision of cut-out portions between the ends of the leaf springs to avoid buckling of the inner radial edge of the springs when a torque is applied thereto.

These and other objects and features will best be appreciated from a reading of the following detailed description of a preferred embodiment thereof, selected for purposes of illustration and shown in the accompanying drawing in which:

Fig. 1 is a view in section of a frictionless pivot constructed in accordance with this invention, and Fig. 2 is a view in section taken along sight line 2—2 of Fig. 1.

Proceeding now to a detailed description of this invention, inspection of Fig. 1 reveals that the various elements of the pivot are organized about a fixed base plate 10. Although the plate is illustrated as being solid and cylindrical, obviously its specific shape will be determined by the particular environment in which the pivot is placed. For example, if it is incorporated into apparatus necessitating an annular base for the pivot member, the base may be formed to comply with the required configuration without departing from the scope of this invention.

Proceeding with the detailed description, a number of radial grooves or slots 12 are observed to be cut into the base and radiate from one particular point on the surface thereof. This point for simplicity is located in the geometric center of the circular surface.

The pivotally movable member in the device illustrated is substantially the same as the base plate and comprises a pivot plate 14 having a plurality of radially disposed grooves or slots 16 equivalent in number and position to the slots 12 in the base. A threaded stud 18 has been illustrated as integrally formed with the plate and is intended merely to represent diagrammatically some means for applying a torsional force to the assembly.

Extending between the base 10 and the pivot plate 14 are a number of leaf springs 20 having their respective terminal portions projecting into the slots 12 and 16. The springs 20 are disposed in planes perpendicular to the pivot plate and base and may be secured in position by soldering, press fitting or any other suitable means. Although eight such springs have been illustrated as supporting the pivot plate on the base, obviously the particular use of the device will dictate the exact number of springs required.

The particular orientation of the leaf springs is of considerable importance and therefore warrants some discussion. As observed, the outer radial edges 22 of the springs substantially define a truncated cone with its base coincident with the surface of the base plate 10. Because the width of the springs is substantially constant throughout their length, being of the same dimensions adjacent each of the plates, considerable additional lateral stiffness is afforded the assembly by disposing the springs in that frusto-conical position, as compared to the inherent stiffness of a similar device having the center lines of the springs disposed perpendicular to each of the plates. This stiffness is particularly effective against lateral forces applied to the pivot plate. Although the springs as positioned in Fig. 1 lend substantial lateral stability to the assembly, it is appreciated that in some uses it may be desirable to orient the springs with their center lines perpendicular to the base and pivot plates. Obviously such a departure from the illustrated embodiment would be within the scope of the invention.

The inner radial edges 24 of the leaf springs 20 are provided with curved recesses 26 to prevent buckling of the springs when a torque is applied to the pivot member. It may be demonstrated by experiment that when a spring of the unrecessed type has a torque applied thereto whose center is not coincident with the center of the spring, the radial inner edge thereof buckles, and continued application of the force will appreciably fatigue the spring. By removing a portion of the otherwise straight inner radial edge, this buckling is eliminated, and the effective life of the spring is greatly increased. Although the recess may be of any configuration, a smooth curve defining it will prevent the introduction of weakness which otherwise would be caused by a recess defined by sharp corners.

Having described the invention illustrated, the advantages thereof may now be fully appreciated. Mention has been made of the lateral stiffness of the assembly and the manner in which this stiffness is enhanced. Furthermore, the ability of the device to withstand substantial compressive forces is readily apparent from an inspection of the drawing. If the springs are firmly fastened to the fixed and pivot plates, obviously the device is also capable of withstanding great tensional force.

It has further been suggested that approximate linearity or a determinable degree of non-linearity of displacement may be obtained when desired. Additional explanation of this advantage will now be presented. It is an inherent quality of a flat metal spring that its angular deflection is non-linear with respect to a force applied thereto. On the other hand, a round bar will deflect linearly with the torque applied to it. Therefore, it will be understood that if the cross section of the springs 20 should approach circular form, the deflection of the plate 14 will approach linearity with the torque applied to the assembly. The angular position of the springs will also effect the degree of non-linearity of the pivot. Since the angle of the springs with the base may be any desired number of degrees, by selecting the proper shape and angle for the springs, any degree of non-linearity may be derived from the instrument.

Familiar with the teachings set forth above, a man skilled in the art to which this invention pertains may foresee numerous modifications which may be imparted to the device without departing from the scope of the invention. Therefore, it is not my intention that this invention be limited to the specifically described and illustrated embodiment, but only by the appended claims and their equivalents.

What I claim as new and desire to secure by Letters Patent of the United States is:

1. A pivot comprising a plate, a plurality of slots cut into the surface of said plate radiating from the center of said plate, a plurality of leaf springs mounted in the respective slots in said plate and lying in planes perpendicular to said surface, the radially outer edges of said springs substantially defining a truncated cone with its base on the surface of said plate, and a pivot plate having a plurality of slots receiving the respective free ends of said leaf springs permitting limited frictionless rotation with respect to said base.

2. A pivot comprising a base plate, a plurality of slots cut into the surface of said plate and radiating from the center of said plate, a plurality of leaf springs mounted in said respective slots and lying in planes perpendicular to the surface of said plates, the inner radial edges of said springs having curved recesses intermediate the ends thereof, the radially outer edges of said springs defining a truncated cone with its base on the surface of said plate, and a pivot plate having a plurality of radial slots on its surface corresponding in number and angular position to the slots in said base plate and receiving the other ends of said respective springs permitting limited frictionless rotation of said pivot plate with respect to said base plate.

3. A pivot comprising a stationary base, a plurality of leaf springs mounted at one end on said base and lying in planes radiating from a line perpendicular to said base, and a pivot plate secured to the other ends of said leaf springs capable of limited frictionless rotation with respect to said base, said leaf springs having center lines substantially defining a truncated cone having an axis about which said leaf springs are disposed.

4. A pivot comprising a cylindrical base, said base having a plurality of slots cut into the surface thereof, said slots radiating from the center of said surface, a cylindrical pivot plate having a like plurality of slots cut into the surface thereof, said slots in said pivot plate being in respectively similar radial positions to those in said base, and a plurality of leaf springs secured at their ends in opposite slots of said base and said pivot plate permitting limited frictionless rotation of said plate relative to said base, said leaf springs having center lines substantially defining a truncated cone having an axes about which said leaf springs are disposed.

References Cited in the file of this patent
UNITED STATES PATENTS 2,484,823    Hammond _____ Oct. 18, 1949

FOREIGN PATENTS 519,524    Great Britain _____ Mar. 29, 1940